United States Patent
Gibel et al.

(10) Patent No.: US 11,447,162 B2
(45) Date of Patent: Sep. 20, 2022

(54) RAIL BRAKE SYSTEM FOR HIRAIL VEHICLES AND OTHER RAIL VEHICLES AND RAIL EQUIPMENT

(71) Applicant: Fritel & Associates, L.L.C., Waco, TX (US)

(72) Inventors: John Gibel, Waco, TX (US); Daniel Spaulding, Waco, TX (US); Karsten Farley, Waco, TX (US)

( * ) Notice: Subject to any disclaimer, the term of this patent is extended or adjusted under 35 U.S.C. 154(b) by 153 days.

(21) Appl. No.: 16/685,115

(22) Filed: Nov. 15, 2019

(65) Prior Publication Data

US 2020/0156673 A1 May 21, 2020

Related U.S. Application Data

(60) Provisional application No. 62/767,643, filed on Nov. 15, 2018.

(51) Int. Cl.
*B61H 7/12* (2006.01)

(52) U.S. Cl.
CPC ..................... *B61H 7/12* (2013.01)

(58) Field of Classification Search
CPC .......... B60T 1/14; B60T 8/1705; B60T 13/22; B61H 7/12; B61H 7/04; B61H 7/02; B61K 7/08; B61K 7/00; B61K 7/02; B61K 7/04; B61K 7/16; B61K 7/18; B61K 7/20; B61K 7/22; B66C 9/18; B66C 21/00; B66B 1/36; B66B 5/18; B66B 9/00; B66B 17/34; B66B 1/365; B22C 11/00
USPC ..................... 188/43; 140/258–260
See application file for complete search history.

(56) References Cited

U.S. PATENT DOCUMENTS

| | | | |
|---|---|---|---|
| 432,515 A | 7/1890 | Dederick | |
| 754,844 A * | 3/1904 | Brader | B61H 7/00 188/43 |
| 809,632 A * | 1/1906 | Sanders | B61H 7/00 188/43 |
| 1,831,670 A * | 11/1931 | Lavan | E01B 27/17 188/43 |
| 2,172,627 A * | 9/1939 | Snow, Jr. | B61H 7/00 188/43 |
| 2,856,030 A * | 10/1958 | Snow, Jr. | B66C 9/18 188/170 |
| 3,552,320 A | 1/1971 | Traupmann | |
| 4,236,608 A | 12/1980 | Kobelt | |
| 5,865,122 A * | 2/1999 | Hudson | B61K 7/18 104/258 |
| 6,595,333 B2 | 7/2003 | Tremblay et al. | |
| 7,975,811 B2 | 7/2011 | Berliant | |
| 8,646,582 B2 | 2/2014 | Bourhill et al. | |

(Continued)

FOREIGN PATENT DOCUMENTS

DE 3122421 A1 * 12/1982 ............... B23Q 1/28

*Primary Examiner* — Robert A. Siconolfi
*Assistant Examiner* — San M Aung
(74) *Attorney, Agent, or Firm* — John A. Powell (57) ABSTRACT

A rail brake system that may be attached to the undercarriage of a hirail vehicle or other rail vehicle or rail equipment and that includes one or more braking calipers that can be deployed downwardly and used to releasably clamp the heads of one or more rails of a railroad track in order to dynamically brake or statically secure the vehicle or equipment in place in relation to the railroad tracks on which the vehicle or equipment is positioned.

21 Claims, 9 Drawing Sheets

(56) References Cited

U.S. PATENT DOCUMENTS

2012/0241262 A1\* 9/2012 Bourhill .................. B61K 7/08
 188/43
2015/0202935 A1 7/2015 Muthusamy
2017/0328425 A1 11/2017 Kalra et al.
2018/0037443 A1\* 2/2018 Murdoch .................. B66C 9/18

\* cited by examiner

FIG. 11 though the rails themselves are obviously not part of the invention). The head of each rail has a top planar surface,

RAIL BRAKE SYSTEM FOR HIRAIL VEHICLES AND OTHER RAIL VEHICLES AND RAIL EQUIPMENT

PRIORITY CLAIM

This application claims priority to U.S. Provisional Application No. 62/767,643 filed on Nov. 15, 2018, which is hereby incorporated by reference.

FIELD OF THE INVENTION

The present invention is generally directed to rail brake devices that are used to statically secure or to dynamically brake hirail vehicles and other rail vehicles and rail equipment in relation to one or both rails of railroad tracks.

BACKGROUND ART OF THE INVENTION

Although the rail brake system disclosed in this application can potentially be used with many different types of rail vehicles and rail equipment, it is instructive to initially discuss its use with hirail vehicles, which are just one type of rail vehicle with which the system hereby disclosed may be placed into use. It is hoped that doing so will facilitate later explanations of the rail brake system and its functionality. Hirail vehicles (also known as rail-highway or highway-railway vehicles) are a species of rail vehicles, such as utility trucks or trucks carrying cranes or aerial lifts, that are specially adapted to be able to travel alternatively on either railroad tracks or on roads and highways. An example of a hirail vehicle is shown in U.S. Pat. No. 3,581,671 to Hart. As can be seen in FIG. 1 of the Hart patent, a hirail vehicle is a vehicle that has sets of laterally displaced railway wheels that can be used for longitudinal transit along railroad tracks, and also has sets of laterally displaced roadway wheels with tires that are principally used for transit along roads or highways, but which also serve as propulsion means for longitudinal movement of the hirail vehicles along railroad tracks.

As shown in FIG. 1 of the Hart patent referenced above, when the hirail vehicle is positioned on a railroad track, the railway wheels are engaged with the rails of the railroad track in essentially the same manner in which the wheels of locomotives engage with the rails of railroad tracks on which they travel. The railway wheels typically provide the majority of the physical support for the hirail vehicle when it is positioned atop the railroad track. Moreover, while the hirail vehicle is located on a railroad track, the roadway wheels are also positioned on top of the railroad track and are in frictional contact with the top planar surfaces of the rails such that the roadway wheels are used to provide the driving force that moves the hirail vehicle longitudinally backward or forward when it is being driven along the railroad track. When transit along roads or highways is desired rather than along railroad tracks, the railway wheels are typically retracted upward or otherwise repositioned such that only the roadway wheels will be used to move the hirail vehicle when it is driven on roads or highways.

As is well understood, standard railroad track on which hirail vehicles (and other rail vehicles and rail equipment) travel is comprised of two rails positioned a set lateral distance apart. Each of the rails is comprised of a foot, a web, and a head. The heads of the rails are of particular importance with regard to the invention hereby disclosed (though the rails themselves are obviously not part of the invention). The head of each rail has a top planar surface, two lateral side surfaces, and two bottom planar surfaces. The two lateral side surfaces are sometimes described as an inner face and an outer face of the rail's head. The design and geometry of the rails of standard railroad tracks is well known and understood in the art and requires no further explanation, but the structure of the heads of the rails is relevant to understanding certain aspects of how the disclosed rail brake system functions.

The lateral distance between the two rails of the railroad track is known as the "gauge." The gauge of a railroad track is the measured distance between the inner faces of the rail heads of the two rails. For instance, in the United States the standard railroad gauge is 4 feet, 8.5 inches, which means that there is a lateral separation of 4 feet, 8.5 inches between the inner faces of the two rails that comprise the railroad track. As discussed above, each railway wheel of a hirail vehicle is very similar to a train wheel in that it has a wheel tread that is the surface of the front face of the wheel rim that engages a top planar surface of a rail's head as the railway wheel rolls along the rail, and each railway wheel also has a flange that engages with the inner face of the rail on which it is positioned while the hirail vehicle is moving or stationary on the railroad track.

When travelling along railroad tracks, the railway wheels of the hirail vehicle will be extended downward below the vehicle such that they are placed into direct contact with, and support the hirail vehicle on top of, the railroad tracks. However, the tires of the roadway wheels will also be in contact with the top planar surface of the rails. As discussed above, when travelling along roads or highways, the railway wheels of the vehicle are typically held in an upwardly retracted position or in an otherwise stowed position so that they do not come in contact with the roadway, and only the tires of the roadway wheels will come in contact with the surface of the road or highway. As also discussed above, in the typical arrangement, hirail vehicles use the roadway wheels and their tires to provide traction and propelling power for longitudinal movement of the vehicle along railroad tracks, with the main support of the weight of the hirail vehicle during such movement being provided by the railway wheels that are engaged with the rails.

Hirail vehicles frequently need to stop at specific, chosen locations on railroad tracks in order to perform maintenance at those selected locations. For instance, and by way of example only, a hirail vehicle of the utility type carrying a crane type device, or carrying an aerial lift with an attached personnel basket attached at its distal end, may need to stop at a specific, set position or location on railroad tracks in order to perform overhead maintenance work above the tracks at that location. As can be readily appreciated, in such situations it is important that the hirail vehicle be maintained in a stationary, set position at the given location where the maintenance is to occur and that no longitudinal movement or slippage of the vehicle along the tracks occur during the time that the maintenance is being performed at that location. Furthermore, should unintended slippage or movement of such hirail vehicles occur for some reason, it is important to be able to rapidly, dynamically brake the vehicle in relation to the railroad tracks below.

Unfortunately, a significant problem exists with regard to both dynamically braking and firmly securing hirail vehicles to railroad tracks in a stationary position in certain environments and in certain weather conditions. In certain weather conditions, prior art devices have not proved satisfactory in preventing slippage or skidding of hirail vehicles along the length of railroad tracks when it is desired to keep the hirail vehicles stationary at specific locations on the railroad tracks for maintenance to be performed at those locations. Likewise, prior art devices have not proved completely reliable in rapidly, dynamically braking hirail vehicles on railroad tracks when undesirable slippage or longitudinal movement is occurring. These issues are frequently encountered in rainy or icy weather where the coefficient of friction between the track rails and the railway wheels and roadway wheels of the hirail vehicle is reduced by the presence of water or ice on the top planar surface and/or lateral side surfaces (also sometimes referred to as the inner face and outer face of the rail's head) of one or both rails. Oil, grease, other lubricants, or decomposing organic materials on the top planar surfaces and/or lateral side surfaces of the rail heads may also reduce the coefficient of friction. As a result, there is a need for a device that can more firmly and consistently dynamically brake and/or firmly secure hirail vehicles to the rail heads of railroad tracks even when the normal coefficient of friction is significantly reduced by weather conditions or by the presence of foreign substances on the rails. It is a purpose of the present invention to address these needs.

U.S. Pat. No. 6,595,333 to Tremblay discloses a rail brake device designed for securing hirail vehicles to the rails of railroad tracks. However, Tremblay's rail brake device is not adequate in all instances to dynamically brake, or to firmly secure, hirail vehicles in relation to railroad tracks in a reliable manner that will stop undesired movement or slippage already occurring or prevent initiation of longitudinal slippage or skidding of the vehicles along the tracks in the first place. Particularly, when there is ice, water, or a foreign substance on the top planar surface and/or lateral side surfaces (alternatively referred to as the vertical surfaces or inner and outer faces of the rail's head) of the head of the rails, there can be slippage using the Tremblay device. This is because the Tremblay device only provides contact with the top planar surface and inner faces of the two rails, but does not provide contact with outer faces and the two bottom planar surfaces of the rails. Furthermore, the Tremblay device relies on wedging action between the inner faces of the rails in order to hold the hirail vehicle stationary at a set location on the tracks, but this requires that both of the rails must be stable and must have a sturdy and reliable connection to the railroad ties underneath the rails. This is not always possible in situations where one of the rails may have become disconnected from the railroad ties or may be otherwise mechanically compromised. Moreover, it does not appear that the Tremblay device provides a dynamic braking capability if the rail vehicle is already moving along the tracks and it is desired to rapidly and safely brake the vehicle in order to bring it to a stop.

Although hirail vehicles have been described above and are of particular interest with regard to the rail brake system hereby disclosed, it should also be appreciated that the same issues concerning the ability to dynamically brake and safely stop movement and the need to firmly secure vehicles and equipment in place at set positions on the tracks are issues that exist with regard to other types of rail vehicles and rail equipment, and not just with regard to hirail vehicles. The importance of being able to safely stop runaway or otherwise unintentionally moving rail vehicles or rail equipment is easily understood. The importance of preventing slippage or undesirable longitudinal movement of such vehicles and equipment while they are in stationary position on railroad tracks in the same manner as has been described above with regard to hirail vehicles should also be apparent. As a result, the rail brake system hereby disclosed also has applicability with regard to other rail vehicles and rail equipment, and not just hirail vehicles.

There continues to be a real need to find a better way to dynamically brake and also to secure hirail vehicles and other vehicles and equipment to railroad tracks in a more reliable manner in order to safely stop and/or prevent slippage and prevent longitudinal movement of the vehicles or equipment on the rails of the railroad tracks. As mentioned above, these needs are particularly acute in severe weather conditions when there is moisture or ice on the rails of the railroad tracks, or when there is oil, grease or other lubricants, or decomposing organic materials deposited on the rails, all of which can significantly reduce the coefficient of friction between the railway wheels of the rail vehicles or equipment and the rails of the railroad tracks.

SUMMARY OF THE INVENTION

The invention hereby disclosed is a rail brake system that may be attached to the chasis or undercarriage of a hirail vehicle, or the underside or undercarriage of other rail vehicles or equipment, and may thereafter be used to much more aggressively dynamically brake and more firmly secure such vehicles or equipment to either one or both of the rails of railroad tracks in a manner that has not heretofore been provided within the prior art. The rail brake system hereby disclosed makes use of one or more braking calipers that can be used to apply clamping or squeezing pressure by means of a pair of brake shoes whose lower ends can be clamped onto both sides of one, or of both, rail heads of the railroad track on which the rail vehicle or equipment is positioned. The one or more braking calipers of the rail brake system are designed so that they can grip the exposed surfaces of the rail head for each rail head to which the vehicle or equipment is to be braked or secured. The braking calipers provided by some embodiments of the invention provide frictional contact surfaces that can be brought into clamping/squeezing contact with at least both lateral side surfaces of the head of each rail to which they are releasably connected during operation of the rail brake system. In other embodiments of the system, during dynamic braking or during stationary securing of the vehicle or equipment to the tracks, the rail heads will be enveloped within finger-like or jaw-like feet that are provided at the bottom of each of the two brake shoes that comprise each of the braking calipers included within the system. In either embodiment, the dynamic braking capability, and the capability to prevent movement and secure the vehicle or equipment in stationary position on the tracks are superior to prior art rail brakes. In certain embodiments of the system these capabilities are further enhanced because the finger-like/jaw-like feet of the brake shoes can provide gripping, frictional contact with all, or nearly all, of the exposed surfaces of the head of each rail to which they are releasably connected when the rail brake system is in use for dynamic braking or for securing the vehicle or equipment in place on the track.

The rail brake system hereby disclosed is comprised of a carrier frame assembly and one or more frame attachment assemblies that pivotably attach the carrier frame assembly to the underside or chassis of a hirail vehicle or other rail vehicle or equipment. The rail brake system may be attached by means of the one or more frame attachment assemblies to the front, mid-section, or back of a rail vehicle or rail equipment, but in a preferred embodiment for hirail vehicles in particular, the rail brake system is installed near the back of the hirail vehicle with the one or more frame attachment assemblies bolted or welded to the sides or bottom of the chassis of the hirail vehicle, and with the pivotably attached carrier frame assembly being positioned immediately below the chassis of the vehicle when it is in a stowed position. The one or more frame attachment assemblies provide the ability to deploy the attached carrier frame assembly downward through the pivoting connection and actuation means (which means are provided by one or more linkage actuators as described herein). While the hirail vehicle is in transit along railroad tracks or on a road or highway, the carrier frame assembly of the rail brake system may optionally remain stowed being held in an upwardly retracted position immediately beneath and in close proximity to the undercarriage or chassis of the vehicle. When dynamic braking of the vehicle is necessary, or when it is intended to hold the vehicle stationary on a railroad track and prevent longitudinal movement or slippage, the rail brake system may be deployed with the carrier frame assembly pivoted downward to a deployed position by means of the pivoting connection and actuation means provided by components of the one or more frame attachment assemblies. While the carrier frame assembly is in a downwardly deployed position, the brake shoes of the at least one braking caliper provided by the carrier frame assembly may be brought into gripping contact by caliper actuation means such that at least one surface provided at the lower end of each brake shoe is placed into frictional contact with at least a lateral side surface of a rail head. In some embodiments, the lower end of each brake shoe has a finger-like or jaw-like structure with multiple inner surfaces that are designed to provide enveloping frictional contact with the top, side, and bottom surfaces (these surfaces are also sometimes referred to as the top planar surface, lateral side surfaces, and bottom planar surfaces) of a rail head. When dynamic braking or securement of the vehicle in relation to the railroad tracks is no longer desired, the former action of the caliper actuation means and the pivoting connection and actuation means may be reversed such that the braking caliper(s) will "release" the head(s) of the rail(s) to which they were releasably connected during braking or securing of the vehicle in place, and then the carrier frame assembly of the rail brake system may be pivoted upward away from the railroad track back into a stowed position adjacent to the chassis or undercarriage of the vehicle.

As discussed above, while the rail brake system is envisioned by the inventors as being used in connection with hirail vehicles, the rail brake system can alternatively be mounted on the underside or undercarriage of other rail vehicles or rail equipment that are not hirail vehicles. In such alternative applications, the design of the one or more frame attachment assemblies may be altered, but some vehicle or equipment connecting means provided by the altered frame attachment assemblies would nevertheless be welded or bolted to the underside or undercarriage of the non-hirail vehicles or other rail equipment. In such applications, the rail brake system could thereafter be used in the same manner for braking and secure affixation to rails as has been primarily described above for hirail vehicles.

As has also been referenced above, when using the rail brake system hereby disclosed to dynamically brake or to statically secure rail vehicles or rail equipment on railroad tracks, it is not necessary to use both of the caliper brakes in order to dynamically brake or in order to statically secure the vehicle or equipment in relation to both of the rails. In certain situations, one of the rails of the railroad track may not be securely attached to underlying railroad ties or may otherwise be mechanically compromised such that attachment to that rail is not helpful or desirable. In such situations, the rail brake system hereby disclosed may nevertheless be used to secure the vehicle or equipment to a single sturdy rail by using one of the braking calipers of the system to clamp/grip that rail. This is an advantage over the prior art devices because the rail brake system can still be successfully used to dynamically brake or to statically prevent slippage and movement even in situations where only one rail exists or when only one rail is stable.

The embodiments and other features, aspects, and advantages of the present invention may be best understood and appreciated with reference to the following drawings, descriptions, and claims. Where used in the various figures of the drawings, the same numerals designate the same or similar parts. Furthermore, when the terms "top", "bottom", "upper", "lower", "upward", "downward", "distal", "front", "back", "vertical", "horizontal", "first", "second", "third", "inside", "internal", "outside", "external", "end", "ends", "side", "sides", "edge", "edges", and similar terms are used herein, it should be understood that these terms have reference only to the structure shown in the drawings as it would appear to a person viewing the drawings, and such terms are utilized in order to facilitate describing the invention and in order to facilitate a better understanding of the invention.

BRIEF DESCRIPTION OF THE DRAWINGS

The rail brake system will be described with reference to the accompanying drawings, which show important sample embodiments, wherein:

FIG. 10 is a close-up detail view of one of the braking calipers of the system gripping a rail's head while the rail brake system is in a deployed position and is being used to secure a hirail vehicle or other rail vehicle or equipment to a railroad track; FIG. 10 illustrates the additional gripping action provided by optional multiple brake pads that may be provided in an embodiment of the system within the finger-like or jaw-like foot of each brake shoe.

DETAILED DESCRIPTION OF THE PREFERRED EMBODIMENTS

Figure 1:
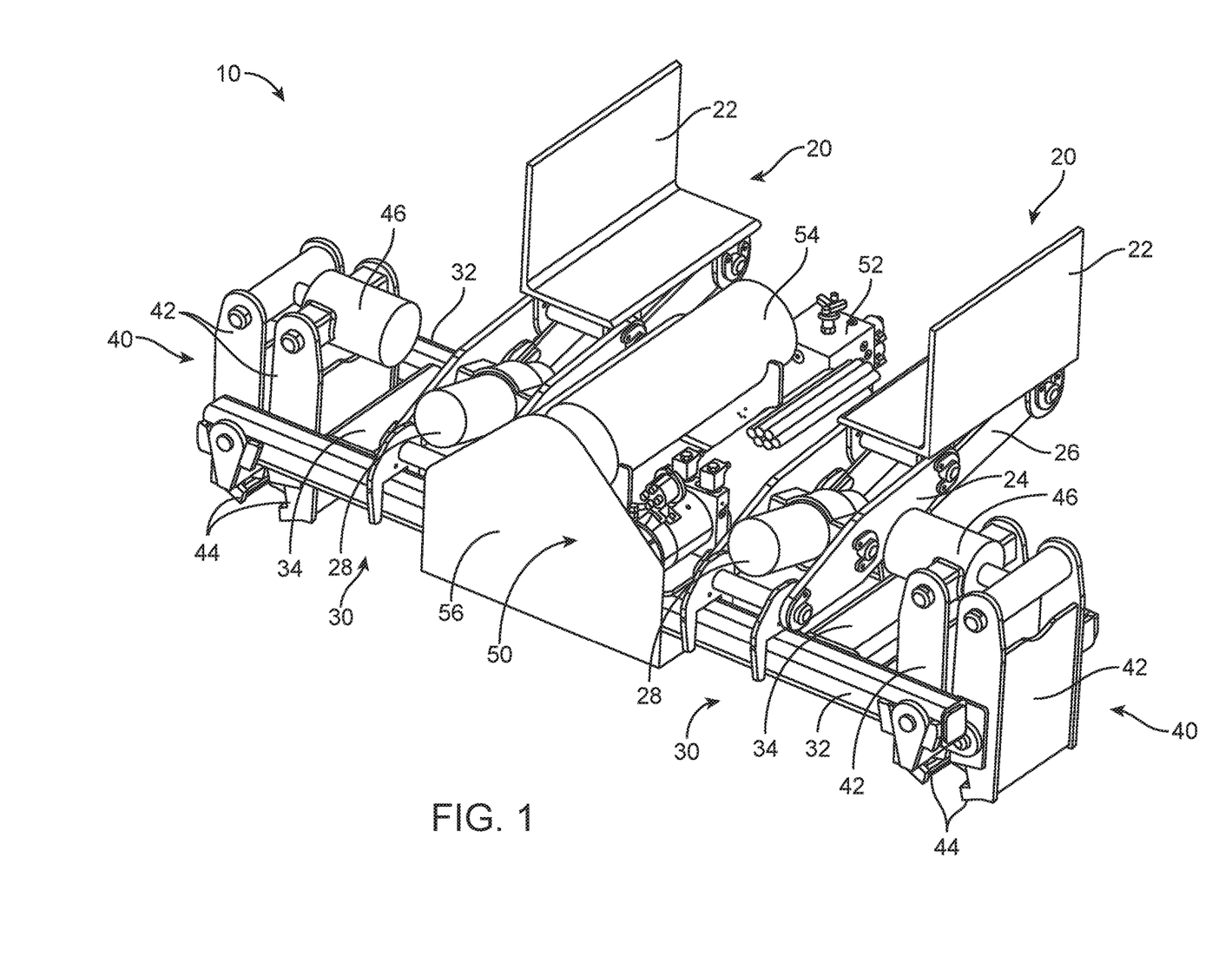
FIG. 1 is a front perspective view of the rail brake system with the system illustrated as it would appear in a stowed position under a hirail vehicle or other rail vehicle or equipment.
Figure 2:
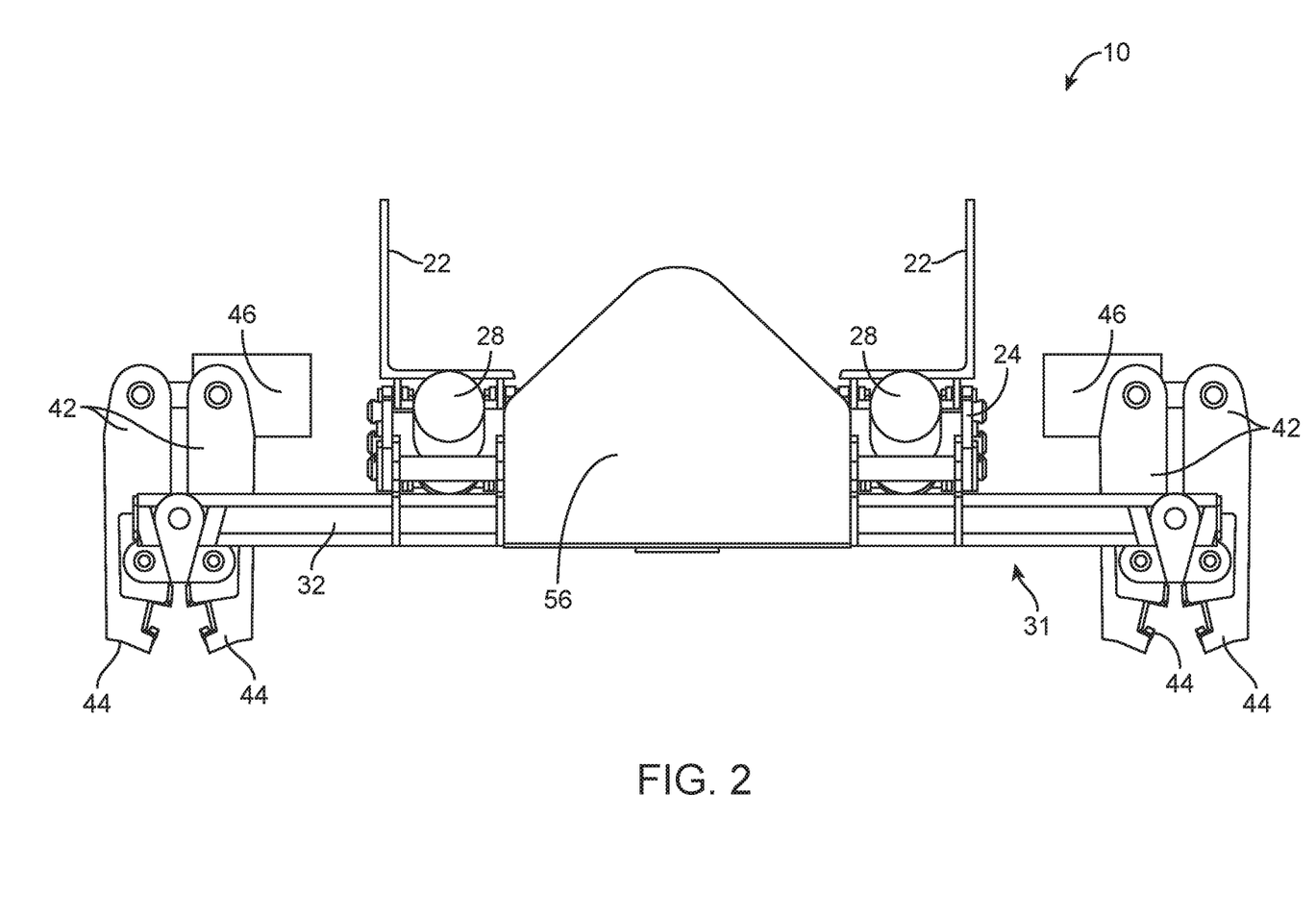
FIG. 2 is a front view of the rail brake system as it would appear in a stowed position.
Figure 3:
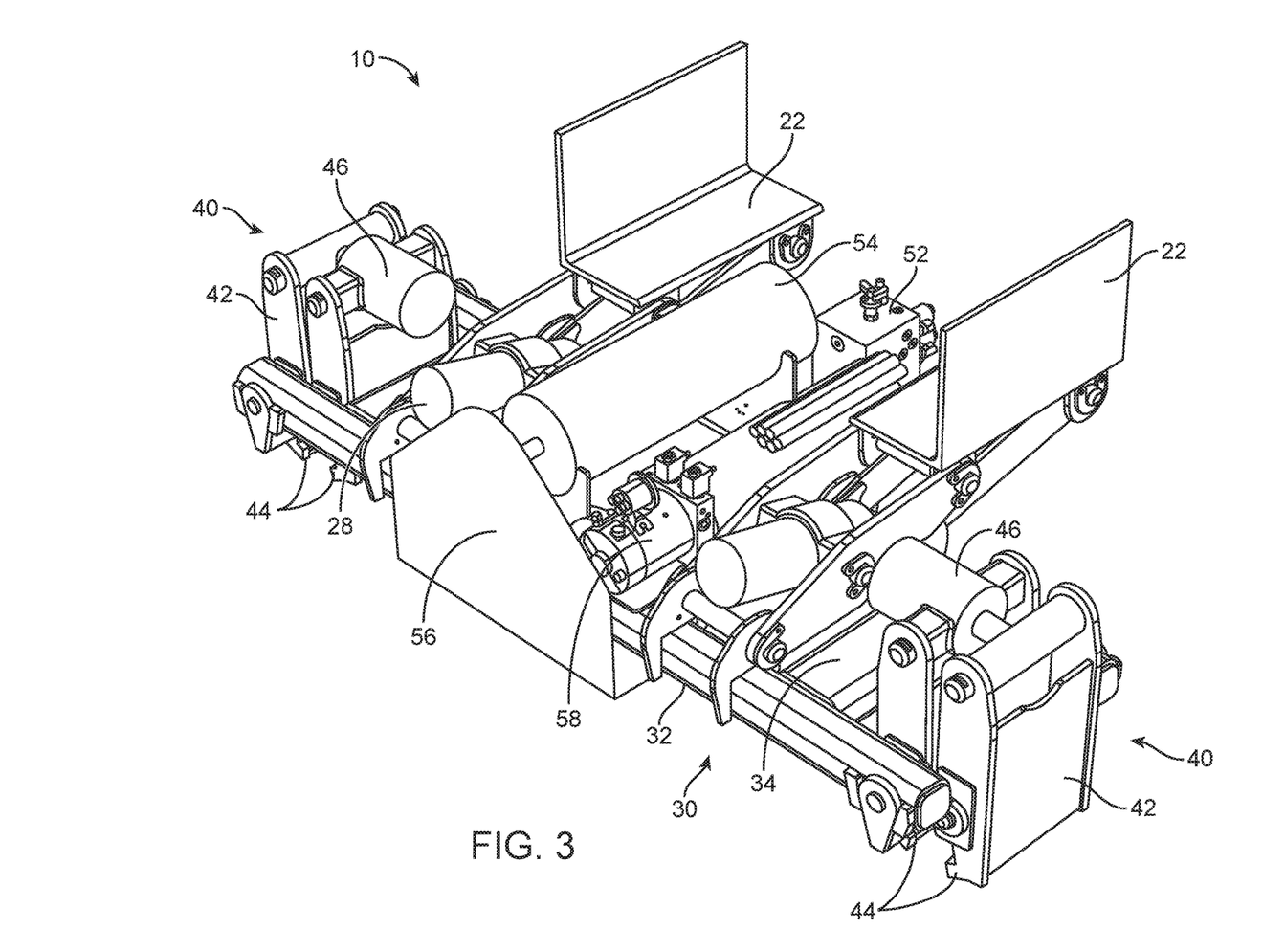
FIG. 3 is another front perspective view of the rail brake system as it would appear in a stowed position

FIGS. 1-3 respectively show two perspective views (FIGS. 1, 3) and a front view (FIG. 2) of the rail brake system 10. At its most basic level of generality, the rail brake system 10 is comprised of one or more frame attachment assemblies 20 that are pivotably attached to a single carrier platform assembly 30 that can be selectively pivoted upwardly to a stowed position in close proximity to the frame attachment assemblies 20, or pivoted downwardly away from the frame attachment assemblies 20 to a deployed position where the carrier platform assembly will be at the level of railroad tracks that are located below a hirail vehicle or other rail vehicle or equipment. The rail brake system 10 is placed into the deployed position at the level of the railroad tracks (not shown in FIGS. 1-3) when it is desired to dynamically brake or statically secure the vehicle or equipment to which the system 10 is attached in relation to the railroad tracks below. Each of the one or more frame attachment assemblies 20 include a frame attachment plate 22, a first linkage 24, a second linkage 26, and a linkage actuator 28. The carrier platform assembly 30 is comprised of a carrier base region 31 that includes two transverse tubes 32 that are parallel to each other and rigidly attached to two cross tubes 34 that are parallel to each other but are orthogonal to the two transverse tubes 32. The carrier platform assembly 30 also includes at least one, and preferably two, braking calipers 40, which are each themselves comprised of one caliper actuator 46 and at least two brake shoes 42 that are connected to one another by the caliper actuator 46. Each of the brake shoes 42 may optionally feature a finger-like or jaw-like foot 44 (sometimes referred to as "feet" in the plural) at its lower end, with each such foot 44 providing up to three separate inner surfaces for frictional contact with the planar surfaces of a rail head when the system 10 is being used to dynamically brake or secure a vehicle or equipment in place on a railroad track. In a preferred embodiment of the rail brake system 10, one or more frictional braking materials, such as a brake pad or other metallic, polymeric, or composite material (such as rubber or steel or composites thereof) may be attached to the bottom ends of the brake shoes 42 for use in making frictional contact with one or more surfaces of a rail head when the system 10 is in use. In some embodiments, inner surfaces of each foot 44 of each brake shoe 42 will have attached frictional braking material or a brake pad (the optional frictional braking materials or brake pads are not readily visible in FIGS. 1-3, but are illustrated in other figures as discussed below).

In some embodiments the carrier platform 30 further includes a brake hydraulic system 50 that is comprised of a hydraulic manifold 52, a guard 56, and a 12V DC motor 58. The brake hydraulic system 50 may also optionally include an accumulator 54, but this is not used in most embodiments. The brake hydraulic system 50 further includes a hydraulic component support, hydraulic fluid tank, and hydraulic hosing (none of which are separately numbered in FIGS. 1-3). FIG. 3 is a perspective view of the rail brake system 10 that generally illustrates most of the same components of the rail brake system 10 as are shown in FIGS. 1-2.

Figure 4:
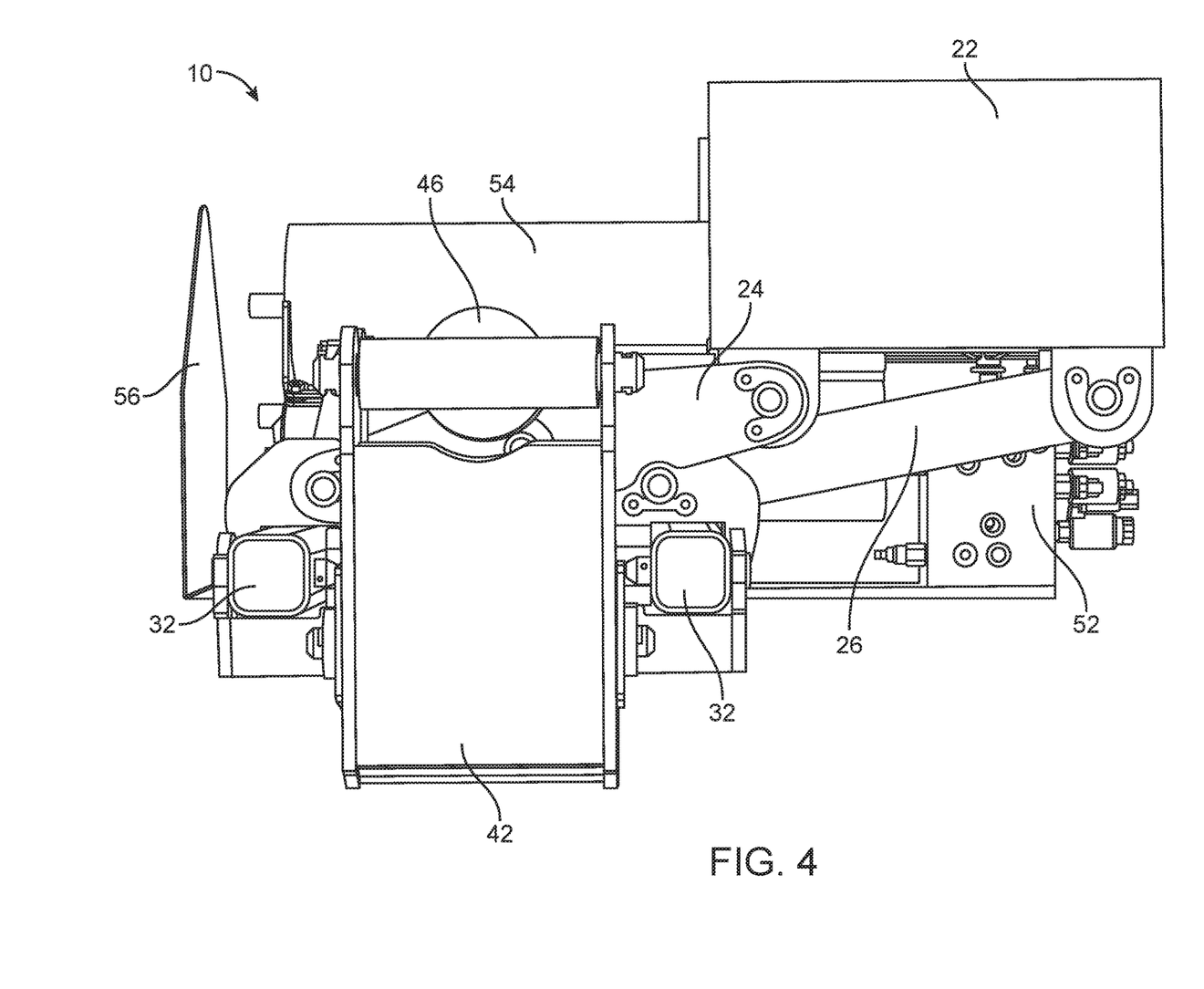
FIG. 4 is a side view of the rail brake system as it would appear when it is in a stowed position.

FIG. 4 is a side view of the rail brake system 10 that again demonstrates some of the same subassemblies and components of the invention as previously illustrated in FIGS. 1-3. As can be understood with reference to FIGS. 1-4, when the rail brake system 10 is not in operation and is in a stowed position as illustrated in FIGS. 1-4, the first linkage 24 and second linkage 26 are maintained in a first position in relatively close proximity to the frame attachment plate 22 of each of the one or more frame attachment assemblies 20, but in order to deploy the rail brake system 10 downwardly, the first linkage 24 and second linkage 26 will be pivoted downwardly away from the frame attachment plate 22 by means of the linkage actuator 28 so that the carrier platform assembly 30 and carrier base region 31 are deployed to a close proximity with, and will be at the level of, the railroad track's rails that are located below the rail vehicle or rail equipment.

Figure 5:
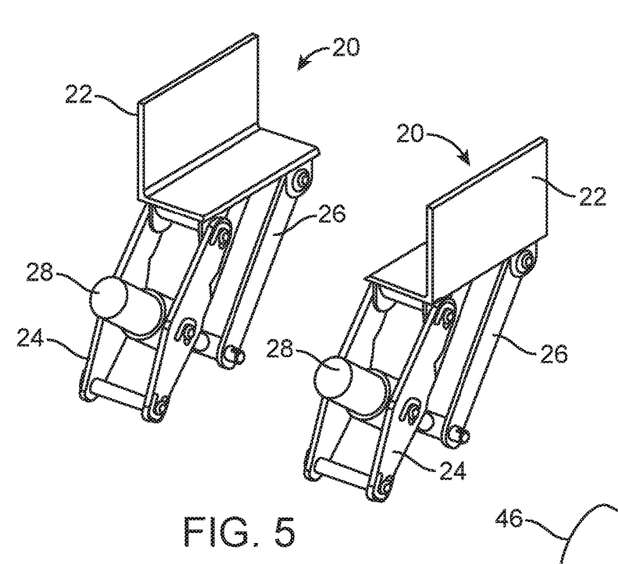
FIG. 5 is a perspective view of sample embodiments of the two frame attachment assemblies of the rail brake system in isolation as they would appear when the rail brake system has been moved downwardly away from the stowed position and placed into a deployed position at the level of the rails of a railroad track.

FIG. 5 is a perspective view of two frame attachment assemblies 20 in isolation with their frame attachment plates 22, first linkages 24, second linkages 26, and linkage actuators 28. FIG. 5 is intended to illustrate how the frame attachment assemblies 20 appear when the rail brake system 10 is placed into a downwardly deployed position. Although the two frame attachment assemblies 20 are illustrated in FIG. 5 in isolation from the entirety of the rail brake system 10, it should be appreciated that one or more frame attachment assemblies 20 will serve as integral subassemblies of the rail brake system 10 as a whole. Furthermore, while the rail brake system 10 has been described as including at least one frame attachment assembly 20, in a preferred embodiment the system 10 will include two complimentary frame attachment assemblies 20 that are laterally displaced from each other, and both of which are pivotably connected to the carrier platform assembly 30 by means of a first linkage 24 and a second linkage 26. Indeed, the attached drawings generally show the rail brake system 10 in such a preferred embodiment.

Figure 6:
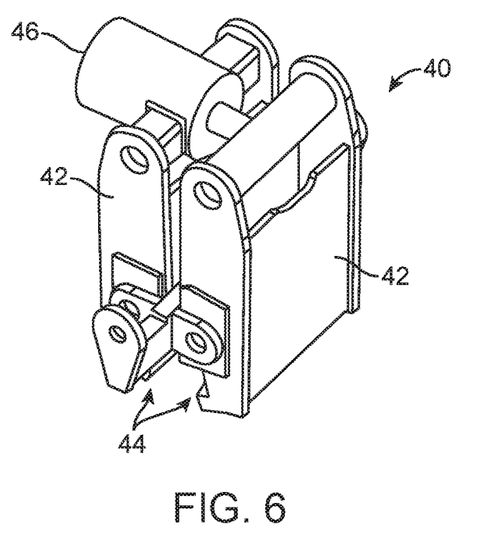
FIG. 6 is a perspective view of one of the two braking calipers of the rail brake system shown in isolation from the rest of the system.
Figure 7:
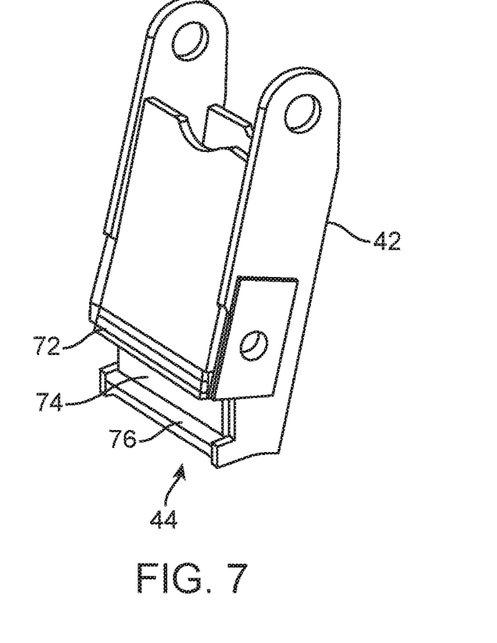
FIG. 7 is a perspective view of one of the two brake shoes that are part of each braking caliper with the brake shoe being shown in isolation from the rest of the system in order to illustrate the finger-like or jaw-like structure of the foot of each brake shoe provided in certain embodiments of the invention, along with optional multiple brake pads that may be attached to the inner surfaces provide by the foot of each brake shoe.

FIGS. 6 and 7 are perspective views of one of the braking calipers 40 and one of the brake shoes 42, both respectively shown in isolation from the system 10 as a whole. As illustrated in FIGS. 1-4, in most embodiments the carrier platform assembly 30 of the rail brake system 10 will include two separate braking calipers 40, each comprised of a caliper actuator 46 and two brake shoes 42 that are connected to one another by the caliper actuator 46 such that the caliper actuator 46 may be used to move the two brake shoes 42 in relation to one another. FIG. 6 shows a single braking caliper 40 that is comprised of two brake shoes 42. In some embodiments each of the brake shoes 42 features a finger-like or jaw-like foot 44 at its lower end. As can be understood when viewing FIG. 6, the brake shoe feet 44 can be biased toward each other in a clamping-type manner by means of the caliper actuator 46 connecting the upper ends of the brake shoes 42 such that the feet 44 of the brake shoes 42 may be forced toward each other in order to provide frictional contact with and grip onto the head of a rail of a railroad track (not shown in FIG. 6 or 7). Each of the brake shoe feet 44 of the embodiment of the braking caliper 40 illustrated in FIG. 6 provide multiple inner surfaces (typically, but not necessarily, three such surfaces) that are designed to be placed into frictional contact with planar surfaces of a rail head when a braking caliper 40 of the system 10 is used to releasably clamp onto the head of a rail.

FIG. 7 illustrates an embodiment of a single brake shoe 42 in isolation in order to demonstrate that the inner surfaces provided by the finger-like or jaw-like structure of each brake shoe foot 44 may themselves optionally provide a top brake pad 72, side brake pad 74, and/or bottom brake pad 76, respectively. As can be appreciated, when the rail brake system 10 is deployed downwardly toward a railroad track below the vehicle or equipment to which it is attached, the caliper actuators 46 can be used to close the brake shoe feet 44 toward each other in order to releasably clamp a rail's head such that the inner surfaces of the finger-like or jaw-like feet 44, or the optional brake pads 72, 74, 76, will come into frictional contact with, and cooperate to grip, the exposed surfaces of the rail's head by means of contact between the planar surfaces of the rail's head and the corresponding inner surfaces, or in some embodiments, the optional brake pads 72, 74, 76 of the brake shoe feet 44. Further, although the embodiment illustrated in FIG. 7 is described as featuring optional brake pads 72, 74, 76 that may be attached to the inner surfaces of brake shoe feet 44, it should be noted that any frictional braking material, whether metallic, polymeric, or composite in nature (such as sheets or plates of rubber or steel or composites thereof), could be attached to the inner surfaces of the brake shoe feet 44 rather than using a traditional brake pad material. In fact, it is also possible to practice the invention without any such brake pads and without any such frictional braking material being attached to the lower ends or feet 44 of the brake shoes 42 since even bare metal, plastic, or composite surfaces of the brake shoes 42 would be capable of frictional contact with surfaces of the rail heads when the braking calipers 40 are used to releasably clamp the rail heads between the brake shoes 42, but generally it is preferred to include either brake pads or other frictional braking material on the bottoms of the brake shoes 42 or on the inner surfaces of the feet 44 in certain embodiments.

Figure 8:
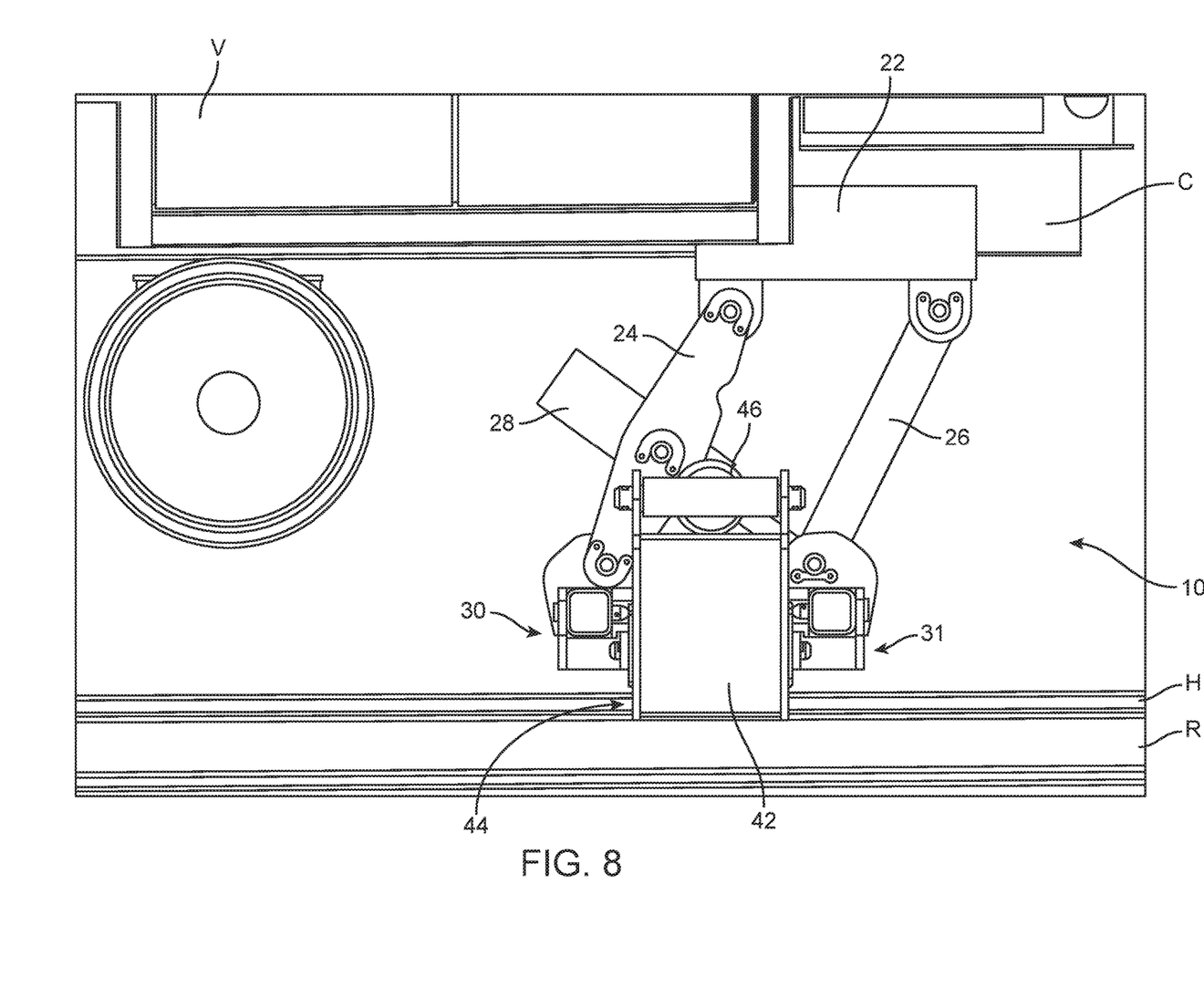
FIG. 8 is a side view of the rail brake system in a deployed position underneath a hirail vehicle or other rail vehicle or equipment to which it is attached showing the carrier platform deployed to the level of the rails of the railroad track below.

FIG. 8 shows a side view of the rail brake system 10 in which the carrier platform assembly 30 has been pivoted downwardly by means of the first linkage 24 and second linkage 26 to a deployed position in order to secure a vehicle (V) to at least one rail (R) of railroad tracks below. As shown in FIG. 8, when the rail brake system 10 is in the downwardly deployed position, the first linkage 24 and second linkage 26 are pivoted downwardly away from the frame attachment plates 22 that are attached to the hirail vehicle (V) by means of the linkage actuators 28 such that the carrier platform assembly 30 and carrier base region 31 are brought into close proximity with the said at least one rail (R) of the railroad track below the vehicle (V). The caliper actuators 46 are then used to clamp the lower ends of the brake shoes 42 onto the rail's head (H) such that the lower ends of the brake shoes 42, or in some embodiments the inner surfaces of the brake shoe feet 44, will be releasably clamped in frictional contact with the planar surfaces of the rail's head (H) and will thereby cooperate to grip the rail's head (H) to dynamically brake the vehicle (V) or to prevent slippage and hold the vehicle (V) stationary in a desired location on the railroad track.

Figure 9:
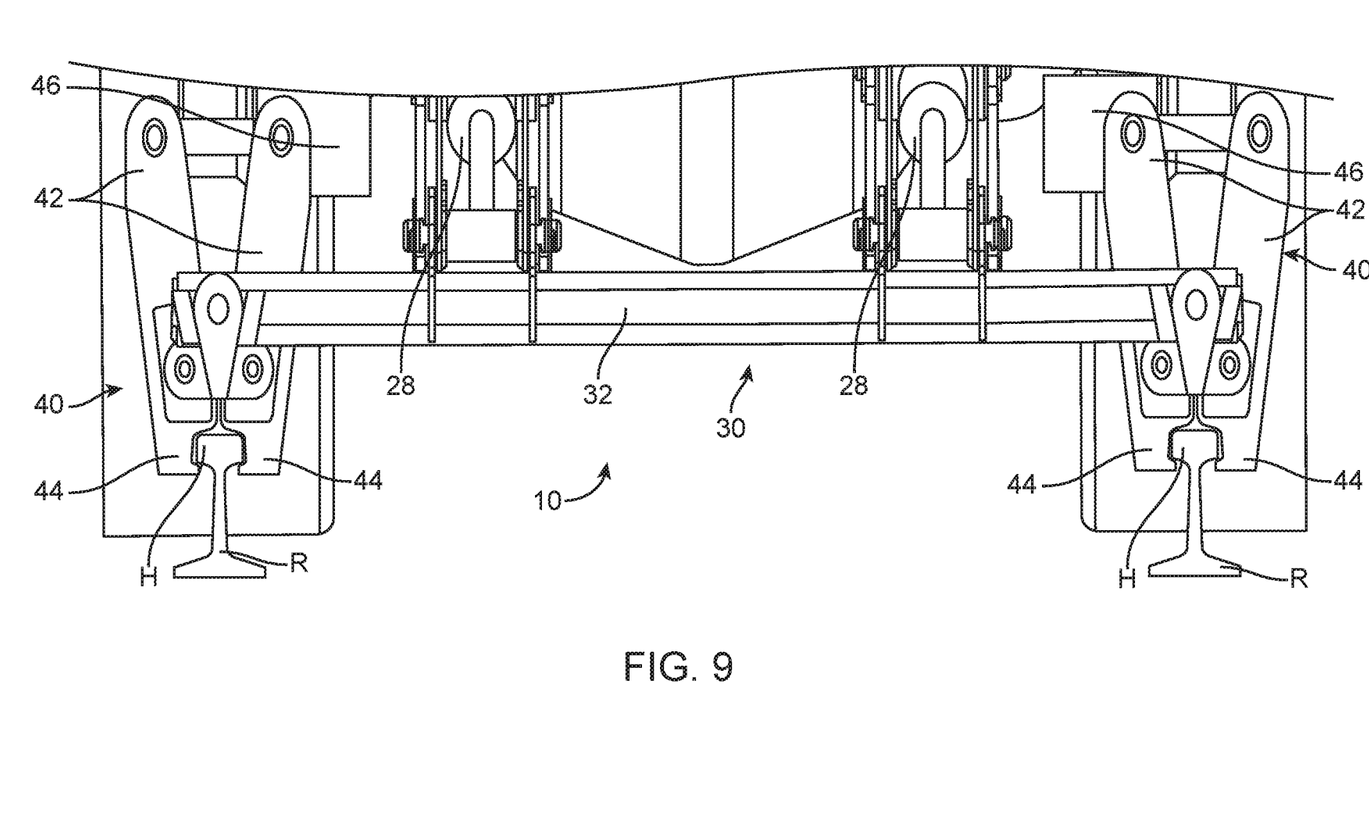
FIG. 9 is a back view of the rail brake system in a deployed position underneath a hirail vehicle illustrated with the braking calipers and the finger-like or jaw-like feet of the brake shoes gripping the exposed surfaces of the heads of the rails of a railroad track.

FIG. 9 shows a back view of one embodiment of the rail brake system 10 mounted on a hirail vehicle with the carrier platform assembly 30 shown in its downwardly deployed position and with the braking calipers 40 fully engaged so that the foot 44 of each brake shoe 42 cooperates with another foot 44 to grippingly engage the heads of the rails (H), with the inner surfaces of each foot 44 being placed into frictional contact with a planar surface of a rail head and the two feet 44 of each brake shoe 42 cooperating to envelop the top planar surface, lateral side surfaces, and bottom planar surfaces of each of the rail heads (H) in order to secure the hirail vehicle to the rails (R). Frictional contact between the rail heads (H) and the bottom of each brake shoe 42 may occur even when the bottom ends of each brake shoe 42 merely provide a single, bare metal side surface of sufficient surface area for releasably clamping the heads of the rails (H), but in the embodiment shown in FIG. 9, the feet 44 of the brake shoes 42 feature the finger-like or jaw-like structure shown in the drawing with multiple inner surfaces for achieving frictional contact with multiple surfaces of the rail head (H) when the braking calipers 40 are used to releasably clamp onto the rails (R).

Figure 10:
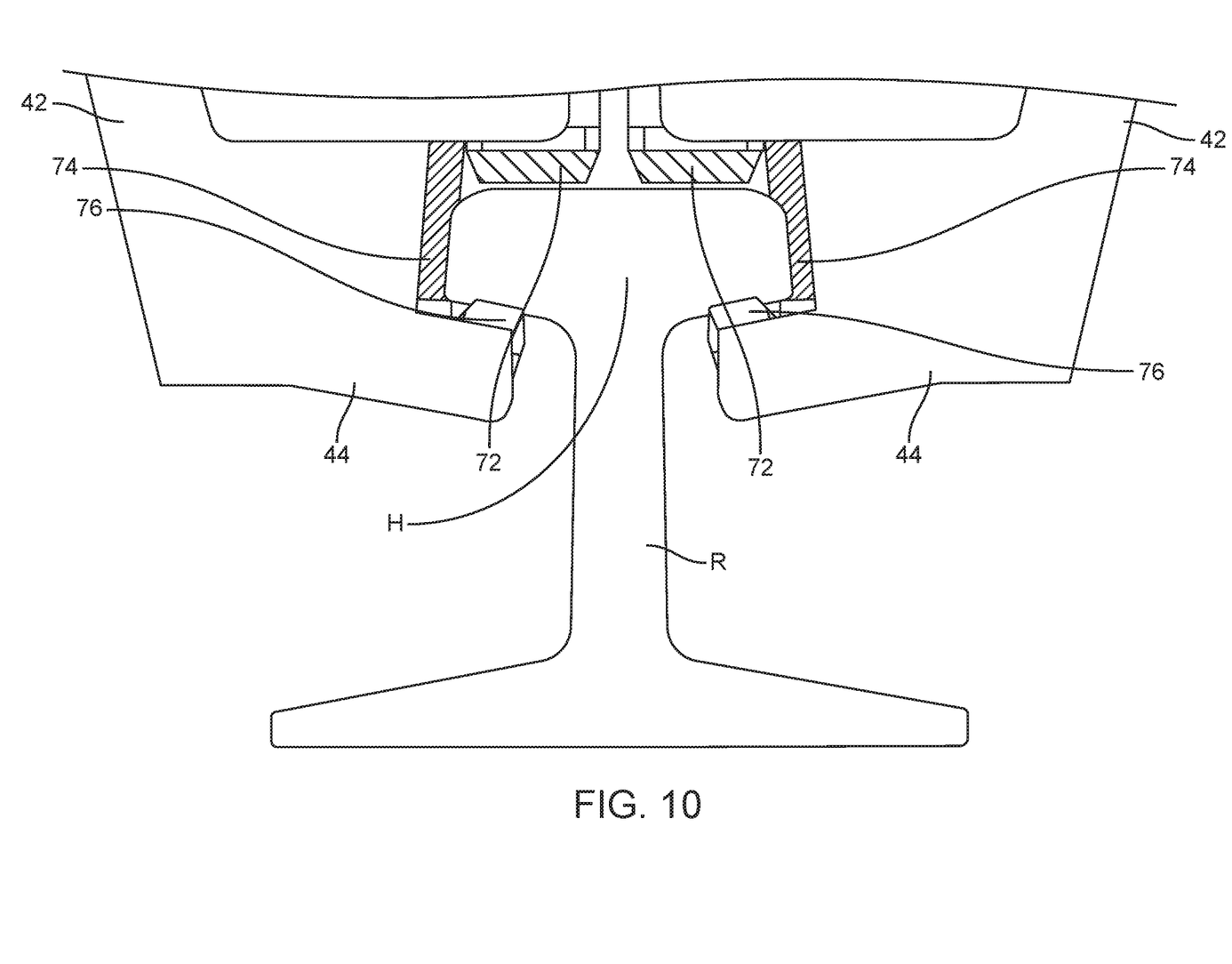

FIG. 10 is a detail view of an embodiment showing the engagement and envelopment of the head (H) of one of the rails (R) by brake shoe feet 44 of brake shoes 42 of one braking caliper 40 when the rail brake system 10 and the carrier platform assembly 30 are in a deployed position and are fully engaged in releasably clamping and gripping the rail (R). As can be better appreciated in FIG. 10, when an embodiment of the system 10 and its carrier platform assembly 30 are deployed downward to the level of the rail (R), and when a braking caliper 40 is engaged in a clamping manner with the head of a rail (H) by means of a caliper actuator 46 forcing feet 44 of the brake shoes 42 together to releasably clamp and grip the rail head (H), the top brake pad 72, side brake pad 74, and bottom brake pad 76 provided on the inner surfaces of each brake foot 44 in certain embodiments will cooperate to at least partially envelop, and will be grippingly held against, the respective top planar surface, lateral side surfaces, and bottom planar surfaces of the rail's head (H) in order to firmly secure the vehicle or equipment to the rail (R) so that the vehicle or equipment is dynamically braked or maintained stationary on the railroad track at a set location. As explained previously, although brake pads are illustrated, other frictional braking materials may be used for this purpose.

Figure 11:
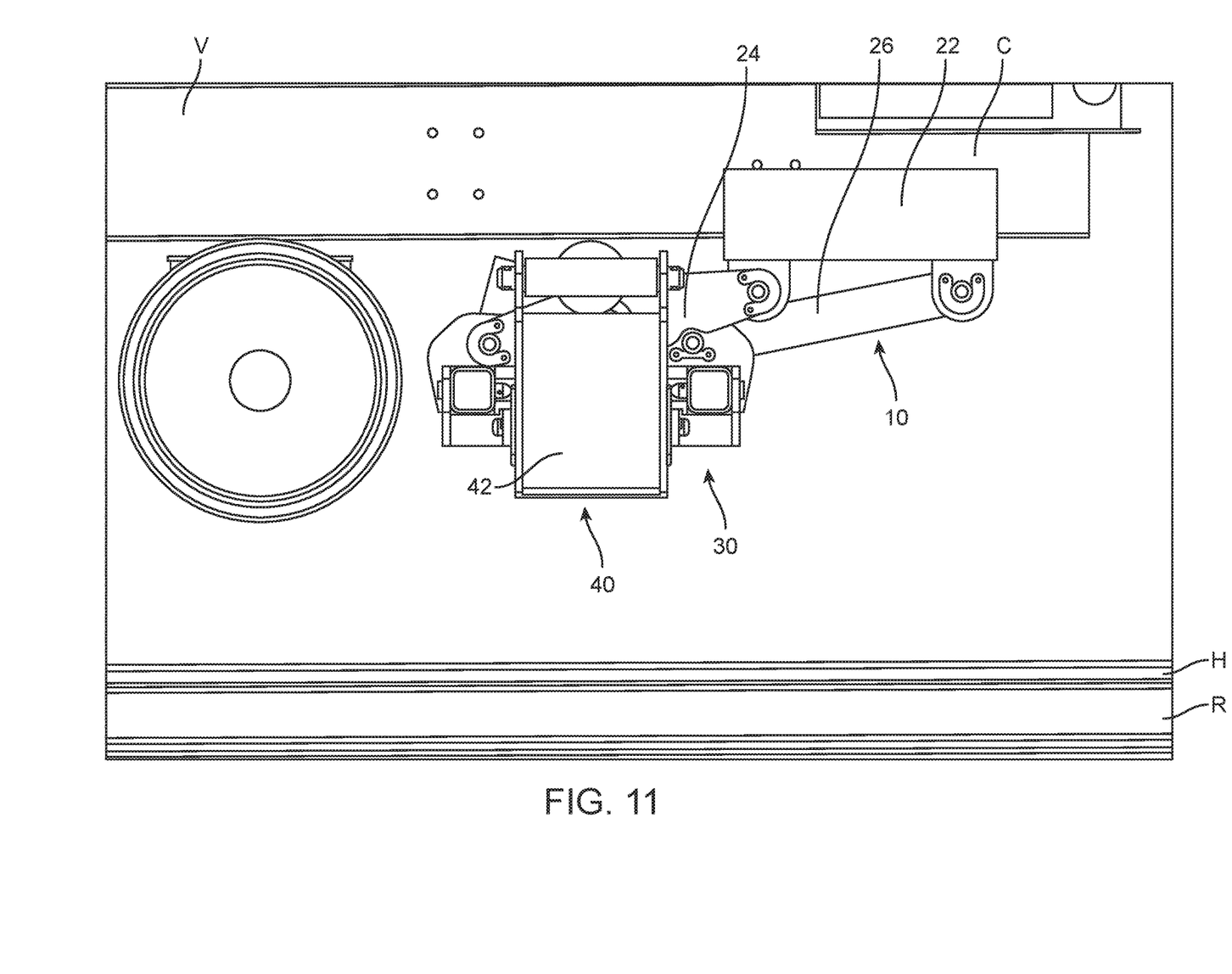
FIG. 11 is a side view of the rail brake system in a stowed position underneath a hirail vehicle or other rail vehicle or equipment to which it is attached.

FIG. 11 shows a side view of the rail brake system 10 installed on the chassis (C) of a vehicle (V). The rail brake system 10 is shown in the stowed position in FIG. 11 with the first linkages 24 and second linkages 26 having been pivoted upwardly toward the frame attachment plates 22 such that the carrier platform assembly 30 and braking calipers 40 are held in place in a stowed position immediately below the frame attachment assemblies 20 and in proximity to the chassis (C) of the vehicle (V) and are no longer in close proximity to the rails (R) of the railroad track below. It should be understood that in operation the frame attachment plates 22 will typically be bolted or welded to the chassis (C) of a vehicle (V) when the rail brake system 10 is installed, and so the pivoting of the linkages 24, 26 upwardly toward, or downwardly away from, the frame attachment plates 22, will move the carrier platform assembly 30 and braking calipers 40 upwardly toward the chassis (C) of a vehicle (V), or downwardly towards the rails (R), respectively. It should also be understood, as explained above, that the rail brake system (10) is capable of use not only in connection with a hirail vehicle or other rail vehicle, but may also be attached to the undercarriage or body of other rail equipment for which dynamic braking or maintenance in a stationary position on railroad tracks is desired.

When installed on hirail vehicles, the rail brake system hereby disclosed is an improvement over the prior art because it allows for gripping frictional contact with both lateral side surfaces of the heads of rails through the releasable clamping action of the braking calipers that clamp closed, at least in part, on the two lateral side surfaces of the rail heads. This provides for a more aggressive braking or securing of the hirail vehicle in relation to the rails of the track than heretofore accomplished.

In some embodiments of the invention, the braking calipers are capable of providing a gripping engagement that envelops all or a substantial portion of each of the planar surfaces of the heads of the rails such that the top planar surface, lateral side surfaces, and bottom planar surfaces of the rail heads are all at least partially, or completely, enveloped within, and grippingly engaged by frictional contact with, multiple surfaces provided at the bottom end of each brake shoe when the vehicle or equipment to which the system is attached is dynamically braked or statically secured to the railroad tracks using the system. Such embodiment of the rail brake system is an advancement over the prior art, in part, because of a recognition that commonly the elements or substances that reduce the coefficient of friction between railroad tracks and the railway wheels of hirail vehicles, rail vehicles and other rail equipment, such as water, ice, oil, grease, other lubricants, or decomposing organic matter, are often wholly, or at least preferentially, deposited on the top planar surface and sometimes the lateral side surfaces of the rail heads, but often are not present on the bottom planar surfaces of the rail heads that are gripped by the inner surfaces of the finger-like/jaw-like feet of the brake shoes.

Another improvement over the prior are provided by the rail brake system disclosed by this application is the ability to grip a single rail of the railroad track in order to brake or prevent slippage. Whereas systems such as that disclosed by Tremblay make use of wedging action that relies upon both rails of a railroad track being sturdy and providing stable physical support due to connection with the railroad ties below the railroad tracks, the rail brake system may be used to brake or maintain a hirail vehicle or other rail vehicle or equipment in stationary position on a railroad track by using only one of the braking calipers to releasably clamp onto one of the rail heads below. Thus, in situations where a rail is missing, mechanically compromised, or generally not stable or sturdy for some reason, the rail brake system can be used for its intended purpose so long as at least one stable rail is present.

Additionally, it should be noted that the linkage actuators and caliper actuators of the rail brake system may be air, mechanical, or gas charge actuators, but in the preferred embodiment of the invention, the linkage actuators and caliper actuators are both hydraulic actuators. Also, as explained previously, in some embodiments of the invention, the inner surfaces of the finger-like/jaw-like feet of each brake shoe may themselves be placed directly into frictional contact with the surfaces of a rail head when the rail brake system is used to releasably clamp or grip onto a railroad track, but in a preferred embodiment either a single brake pad, or multiple brake pads, or other frictional braking materials will be attached to the inner surfaces of the feet of each brake shoe in order to enhance frictional contact with the rail head when the system is in use braking or securing the vehicle or equipment to the track. It is also preferred to have three inner surfaces provided by the feet of each brake pad corresponding to the planar surfaces of the rail heads to which they will come in frictional contact so that the surfaces of the feet will envelop the rail head when the braking calipers are clamped onto the rail head, but it is possible to practice the invention with fewer than three inner surfaces provided by the feet of the brake shoes or to simply use a single bottom surface provided at the distal end of each brake shoe. For instance, the foot of each brake shoe could provide only one surface at its bottom end that was intended for frictional contact with a lateral side surface (inner face or outer face) of the rail head when the braking calipers were clamped onto the rail head, but provide no second or third surface intended for contact with the top surface or bottom planar surfaces of the rail head, and this simplified arrangement would still be within the scope of the invention.

As used in the claims below, the term "rail vehicle" is intended to encompass both hirail vehicles and other types of non-hirail vehicles that use railway wheels in order to travel along railroad tracks. The descriptive terms "finger-like" and "jaw-like" as used above and in the claims with regard to the structure of the feet of the brake pads in certain embodiments should be understood as meaning there are multiple distinct inner surfaces provided by the brake feet that may be used for frictional contact with distinct surfaces of a rail head, and can perhaps best be understood with reference to the structure of the feet shown in the drawings. Also, the terms "rail head", "rail's head", "head of a rail", and "head of the rail" are all synonymous and refer to the typical head structure of a rail of a railroad track, which as described, features a top planar surface, two lateral side surfaces (sometimes referred to as faces or as an inner face and outer face), and two bottom surfaces.

It should be appreciated that various components and relationships between the components of the rail brake system could be altered without changing the inventive concept hereby disclosed. Although the inventive concepts hereby disclosed have been described with reference to specific embodiments, it should be understood that the described specific embodiments are not intended to limit the scope of the inventive concepts disclosed, but merely to illustrate some of the specific embodiments of the rail brake system. It should be understood that various modifications of the disclosed embodiments, as well as alternative embodiments of the inventive concepts, will be apparent to persons skilled in the art upon reference to the description of the embodiments that is provided or upon reference to the appended claims. It is, therefore, contemplated that the appended claims will cover and read upon all such modifications and alternative embodiments that fall within the scope of the inventive concepts that are claimed by the inventors.

What we claim is:

1. A rail brake system that may be mounted to the underside or undercarriage of a rail vehicle or rail equipment, wherein the rail brake system is comprised of:

a frame attachment assembly that may be used to attach the rail brake system to a rail vehicle or rail equipment wherein each such frame attachment assembly has a frame attachment plate for attachment to the underside or undercarriage of the vehicle or equipment, a first linkage and a second linkage that are cash pivotably attached at their upper ends to the frame attachment plate, and a linkage actuator for actuation of upward or downward pivoting motion by the first linkage and second linkage in relation to the attachment plate, and wherein the first linkage and second linkage each have an elongate structure with a longitudinal axis, and the longitudinal axes of the two linkages remain substantially parallel to each other at all times, including while undergoing pivoting movement;

a carrier platform assembly that is comprised of a frame that is pivotably attached to the lower ends of the first linkage and second linkage such that the carrier platform may be moved upward or downward in relation to the frame attachment plate by the concurrent upward or downward pivoting motion of the first linkage and second linkage, and wherein the carrier platform is further comprised of a first braking caliper, wherein the first braking caliper includes a caliper actuator and a pair of brake shoes, with each brake shoe having a lower end comprised of a surface that may be used for frictional contact with a lateral side surface of a rail head;

wherein the carrier platform may be pivotably moved upwards or downwards in relation to the rail head by means of the pivotable first linkage and second linkage;

wherein when the carrier platform is brought into close proximity to the rail head such that the rail head is between the lower ends of the brake shoes, the caliper actuator may be used to force the lower ends of the brake shoes toward each other in order to releasably clamp the lateral side surfaces of the rail head.

2. The rail brake system of claim 1 wherein the carrier platform assembly is further comprised of a second braking caliper that includes a caliper actuator and a pair of brake shoes, each of which brake shoes has a lower end with a surface that may be used for frictional contact with a lateral side surface of a rail head, and wherein the caliper actuator of the second braking caliper may be used to force the lower ends of the brake shoes of the second braking caliper toward each other in order to releasably clamp the lateral side surfaces of a rail head.

3. The rail brake system of claim 2 wherein the two braking calipers are laterally displaced from each other a set distance corresponding with the gauge of the railroad track on which the vehicle or equipment is to be used.

4. The rail brake system of claim 3 wherein the bottom end of each brake shoe has a foot that is a structure comprised of at least two distinct surfaces, each of which may be used for frictional contact with a distinct surface of a rail head.

5. The rail brake system of claim 4 wherein the foot of each brake shoe has a structure comprised of a third distinct surface which may be used for frictional contact with a distinct surface of a rail head.

6. The rail brake system of claim 2 wherein frictional braking material is attached to the said surface of the lower end of each brake shoe for enhanced frictional contact with a lateral side surface of a rail head when the two braking calipers are releasably clamped onto rail heads.

7. The rail brake system of claim 4 wherein frictional braking material is attached to each of the two distinct surfaces of the foot of each brake shoe for enhanced frictional contact with two distinct surfaces of a rail head when the two braking calipers are releasably clamped onto rail heads.

8. The rail brake system of claim 5 wherein frictional braking material is attached to each of the three distinct surfaces of each that for enhanced frictional contact with three distinct surfaces of a rail head when the two braking calipers are releasably clamped onto rail heads.

9. The rail brake system of claim 2 wherein a brake pad is attached to the surfaces provided at the lower ends of each of the brake shoes.

10. The rail brake system of claim 4 wherein a separate brake pad is attached to both of the two surfaces of the foot of each brake shoe.

11. The rail brake system of claim 5 wherein a separate brake pad is attached to each of the three surfaces of each foot of each brake shoe.

12. The rail brake system of claim 5 wherein the three surfaces of the foot of each brake shoe cooperate to form a jaw-like structure that is comprised of a top planar surface, a side planar surface, and a bottom planar surface, with said surfaces corresponding, respectively, to at least a portion of the top planar surface, a lateral side surface, and a bottom surface of a rail head to which the braking calipers are to be releasably clamped during operation of the rail brake system.

13. The rail brake system of claim 12 wherein when the carrier platform assembly is in a downwardly deployed position in proximity with the heads of the rails, and the caliper actuators of each braking caliper are used to move the lower ends of the brake shoes of each braking caliper toward each other, the top planar surfaces, side planar surfaces, and bottom planar surfaces of the feet of each brake shoe of each braking caliper will cooperate to releasably grip the head of a rail of the railroad track in order to hold the vehicle or equipment in a stationary position on the railroad track.

14. A rail brake system that may be mounted to a rail vehicle or rail equipment comprised of:
   frame attachment means for attaching the rail brake system to the vehicle or equipment;
   pivoting actuation means and pivoting connection means that pivotably connect the two braking calipers to the vehicle attachment means, wherein the pivoting actuation means and pivoting connection means allow for the braking calipers to be pivoted either upwardly toward the frame attachment means or pivoted downwardly away from said frame attachment means toward a railroad track positioned below the vehicle or equipment;
   a first braking caliper comprised of caliper actuating means connecting two brake shoes at their top ends wherein the caliper actuating means allow for the lower ends of the brake shoes to be biased toward each other in order to releasably clamp onto a rail head of the railroad track for dynamic braking or statically securing the vehicle or equipment in relation to the track.

15. The rail brake system of claim 14 further comprising a second braking caliper having the exact same structure as the first braking caliper, but positioned at a set distance apart from the first braking caliper with the distance between the first and second braking calipers corresponding to the gauge of the railroad tracks on which the vehicle or equipment will be used.

16. The rail brake system of claim 15 wherein the lower ends of each of the brake shoes of each braking caliper has a foot that is comprised of at least a lateral side surface that provides for frictional connection to a lateral side surface of a rail head when the braking calipers are releasably clamped onto the rail heads of the railroad track.

17. The rail brake system of claim 16 wherein frictional braking material is attached to the lateral side surface of the foot of each brake shoe.

18. The rail brake system of claim 17 wherein the foot of each brake shoe is further comprised of a top planar surface that provides for frictional connection to a portion of the top planar surface of a rail head when the braking calipers are releasably clamped onto the rail heads of a railroad track.

19. The rail brake system of claim 18 wherein frictional braking material is attached to the top planar surface of the foot of each brake shoe.

20. The rail brake system of claim 18 wherein the foot of each brake shoe is further comprised of a bottom planar surface that provides for frictional connection to one of the two bottom planar surfaces of a rail head when the braking calipers are releasably clamped onto the rail heads of a railroad track.

21. The rail brake system of claim 20 wherein frictional braking material is attached to the bottom planar surface of each brake shoe.

* * * * *

UNITED STATES PATENT AND TRADEMARK OFFICE
CERTIFICATE OF CORRECTION

| | | |
|---|---|---|
| PATENT NO. | : 11,447,162 B2 | Page 1 of 1 |
| APPLICATION NO. | : 16/685115 | |
| DATED | : September 20, 2022 | |
| INVENTOR(S) | : John Gibel, Daniel Spaulding and Karsten Farley | |

It is certified that error appears in the above-identified patent and that said Letters Patent is hereby corrected as shown below:

In the Claims

Column 12 Line 53 Claim 1:
Delete "cash" and insert -- each --.

Signed and Sealed this
Twentieth Day of December, 2022

Katherine Kelly Vidal
*Director of the United States Patent and Trademark Office*